United States Patent [19]

Mehta et al.

[11] 4,421,523

[45] Dec. 20, 1983

[54] CONTROL OF BED HEIGHT IN A FLUIDIZED BED GASIFICATION SYSTEM

[75] Inventors: Gautam I. Mehta, Greensburg; Lynn M. Rogers, Export, both of Pa.

[73] Assignee: The United States of America as represented by the Department of Energy, Washington, D.C.

[21] Appl. No.: 377,231

[22] Filed: May 11, 1982

[51] Int. Cl.$^3$ ............................................. C10J 3/54
[52] U.S. Cl. ..................................... 48/197 R; 34/10; 48/206; 48/210; 48/DIG. 4
[58] Field of Search ..................... 48/197 R, 206, 210, 48/DIG. 4; 422/111; 34/10, 57 A

[56] References Cited

U.S. PATENT DOCUMENTS 2,271,148  1/1942  Becker et al. .......................... 34/10
2,534,051  12/1950  Nelson ............................. 48/DIG. 4
4,191,539  3/1980  Patel et al. ............................ 48/206

FOREIGN PATENT DOCUMENTS 135211  4/1979  Fed. Rep. of Germany ........ 48/210

Primary Examiner—Peter F. Kratz
Attorney, Agent, or Firm—W. E. Otto

[57] ABSTRACT

In a fluidized bed apparatus a method for controlling the height of the fluidized bed, taking into account variations in the density of the bed. The method comprises taking simultaneous differential pressure measurements at different vertical elevations within the vessel, averaging the differential pressures, determining an average fluidized bed density, then periodically calculating a weighting factor. The weighting factor is used in the determination of the actual bed height which is used in controlling the fluidizing means.

6 Claims, 4 Drawing Figures

CONTROL OF BED HEIGHT IN A FLUIDIZED BED GASIFICATION SYSTEM

GOVERNMENT CONTRACT CLAUSE

The invention disclosed herein was made or conceived in the course of, or under, a contract with the United States Government identified as No. DE-AC01-80-ET-14752.

BACKGROUND OF THE INVENTION

1. Field of the Invention

This invention relates to gasification of carbonaceous materials, and more particularly to apparatus for controlling bed height in fluidized bed gasification reactors.

2. Description of the Prior Art

In reactors for the gasification of carbonaceous materials, such as coal, a combustible product gas is produced, as well as solid waste products such as agglomerated ash. In the Process Development Unit (PDU) fluidized bed gasification reactor being operated for the United States Government, there is a single set of vertically positioned concentric injection tubes through which, in addition to particulate coal, various process mediums, such as recycled product gas, steam and oxygen, are injected. Additional fluidizing gas is injected through a sparger ring of circular cross section, concentrically disposed within the lower region of the gasifier vessel to provide a relatively balanced distribution of fluidizing gases across the vessel cross section. An imbalanced distribution can lead to channelling of the fluidizing gas flowing upwardly through the particulate matter. This can cause local slugging, excessive mixing, and local stagnation, as opposed to separation, of the char and ash particles.

In the PDU fluidized bed gasification reactor, feed particulated coal, in addition to producing a combustible product gas, intermediately forms char, and ultimately forms waste ash. The process takes place at temperatures in the range of 1400° F. to 1900° F., and above. The ash must be removed from the vessel, preferably continuously or by an on-line batch process, in order to maintain the process efficiently operational. It is desirable to remove only the ash as opposed to the incompletely reacted char, in order to maintain a high efficiency.

In order to achieve optimum gasification of the feed material it is necessary to provide sufficient residence time of the coal within the reactor vessel. Feed rates of the coal which are too high could force particles with residual gasification potential either down into the ash discharge (with a corresponding reduction in gas output) or up into the gas outlet (requiring additional gas cleanup to maintain gas quality). The effect of injection of too much or too little steam and/or combustion gas would have further detrimental effects on efficiency. What is needed is a method and apparatus for maintaining a material feed rate that is balanced with the gas and ash discharge rates. If the actual bed height of a fluidized bed is known, feedback can be provided to balance the input quantities with the output quantities. The method currently in use for determining bed height provides for a set of differential pressure (D/P) detectors with pressure taps at different elevations to be monitored as follows. A D/P detector with both taps in the gas region will show a differential pressure of 0 psi. However, a D/P detector with both taps in the bed region will show a pressure that is proportional to the weight of the bed contained between the two taps. Once this pressure is known, a D/P detector with one tap in the gas region and one tap in the bed region will show a pressure that is related to the weight of the bed between the two taps. It should be noted that the differential pressure shown will be very small. Over the entire height of the PDU reactor, about 31 feet, the differential pressure is only 1.8 psi. If the bed were completely homogeneous, the D/P detectors could be monitored continuously. Unfortunately, the bed contains numerous density anomalies in the form of pockets of gas, steam or coal, all of which effect the weight of the bed, but not necessarily the height of the bed. As a result, accurate control of the bed height by an automatic control is not possible using this bed height determination method because of rapid and random fluctuation of bed height indication.

What is needed then, is a method and apparatus for controlling the bed height by regulating material input rates, despite the presence of bed density anomalies which influence bed height determination.

SUMMARY OF THE INVENTION

In a fluidized bed apparatus a method for controlling the height of the fluidized bed, taking into account variations in the density of the bed. The method comprises taking simultaneous differential pressure measurements at different vertical elevations within the vessel, averaging the differential pressures, determining an average fluidized bed density, then periodically calculating a weighting factor. The weighting factor is used in the determination of the actual bed height which is used in controlling the fluidizing means.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENT

By empirical observation of fluidized beds, it is known that bed densities at different heights varied in an unpredictable manner. However, it has been found that the relationship between the bed densities of any two adjacent segments, or zones, remained substantially constant, as long as both zones were completely below the bed height. Thus, $$\left[\frac{BD_i}{BD_{i+1}}\right]_{t=0} \approx \left[\frac{BD_i}{BD_{i+1}}\right]_{t=1}$$

where
 BD = bed density
 i = zone i
 i+1 = zone i+1, which is adjacent to and below zone i.

Figure 1:
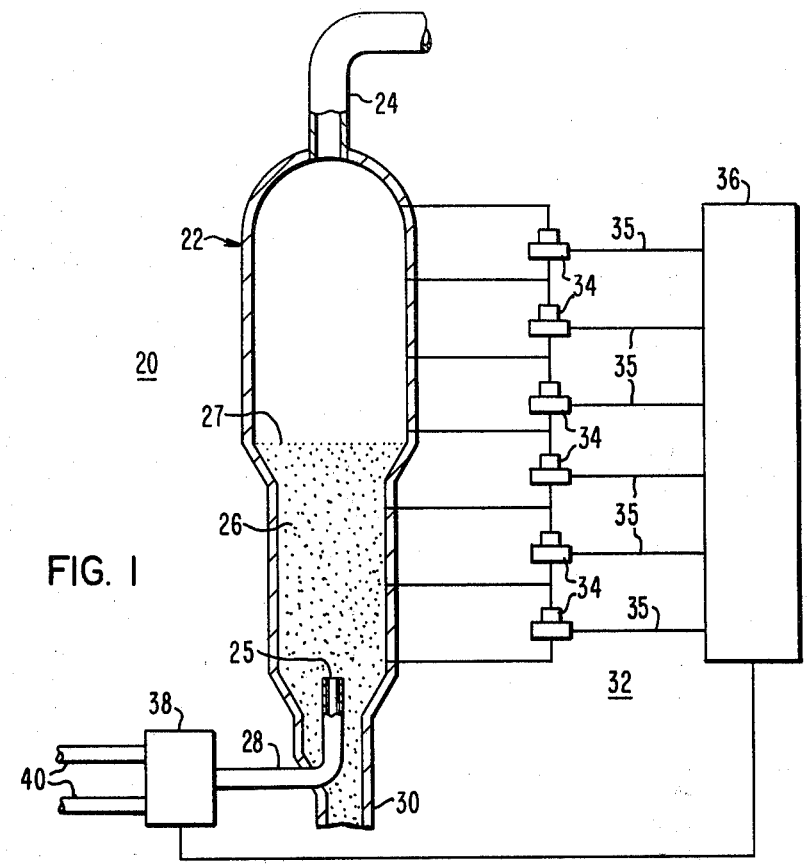
FIG. 1 is a sectional view of a fluidized bed gasification reactor, in accordance with the invention.

Referring now to the drawings in detail and in particular to FIG. 1, there is shown a fluidized bed gasification reactor 20, comprising a vessel 22, having a product gas outlet 24 disposed at its upper end, a fluidizing nozzle 25 extending into the lower portion of the vessel 22, and a fluidized bed 26 having an upper surface or bed height 27, disposed in the lower portion of the vessel 22, a material supply line 28 disposed through the vessel 22 and connected to the nozzle 25, an ash discharge 30 at the bottom of the vessel 22, and a bed height detection system 32 connected to the vessel 22. The bed height detection system 32 comprises differential pressure detectors 34 attached to and sensing the internal pressure of the vessel 22 and which are connected by a signal conducting means 35 to a data processing unit 36. The unit 36 provides a signal to a control manifold 38 which regulates the flow of feed material from feed lines 40 into the material supply line 28.

Figure 2:
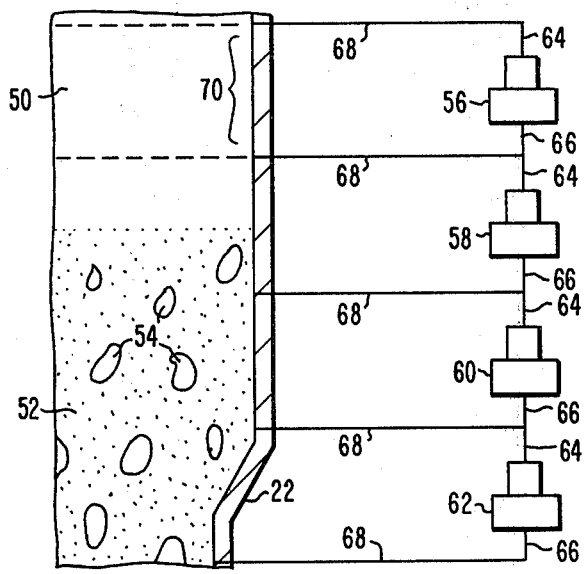
FIG. 2 is a partial sectional view of a fluidized bed, in accordance with the invention.

Referring now to FIG. 2, there is shown a partial sectional view of the vessel 22, containing a gas region 50, and a bed region 52 containing a mixture of a carbonaceous material, process mediums such as steam, oxygen or air and a combustible gas, and bed density anomalies 54 which may be pockets of carbonaceous material or process mediums. Also shown are, from top, first, second, third and fourth differential pressure detectors 56, 58, 60 and 62, respectively. Each has a high pressure tap 64 and a low pressure tap 66, both taps being connected to the vessel 22, with adjacent detectors having a common tap 68 which connects to the high pressure tap 64 for one cell, and the low pressure tap 66 for an adjacent cell. The high and low pressure taps 64, 66 of each detector defines a bed zone 70. It can be seen that the zone 70 for the first detector 56 is completely in the gas region 50, the zone 70 for the second detector 58 is partially in the gas region 50, and the zones 70 for the third and fourth detectors 60, 62, respectively, are completely in the bed region 52.

Referring again to FIG. 1, during operation of the gasification reactor 20, feed material such as coal or fines, air or oxygen, steam and a combustible gas (typically cleaned product gas) are injected into the vessel 22 through the nozzle 25, creating a fluidized bed 27. Ash created in the gasification process is discharged through the ash discharge 30, and product gas is discharged through the product gas outlet 24. The height of the bed will vary, depending on such factors as vessel temperature and pressure and feed and discharge rates. The detectors 34 may provide a continuous input of differential pressure measurements to the data processing unit 36. Using differential pressure measurements from the detectors 34 the bed height 27 is determined using a method as is set out below. This determination will typically be performed by the data processing unit 36. After the bed height 27 is determined, a signal is generated, typically by the data process unit 36, and conducted to the control manifold 38 which regulates the flow of feed material from feed lines 40 into the material supply line 28. Depending on the signal generated, the input rate of one or more of the input feed materials will be modified and the bed height 27 will change accordingly.

The bed height 27, is determined from the detector measurements by a method which computes the bed height in a real-time environment. This takes into account the rapid changes which occur in the detector measurements as well as the differences in the bed densities in the different detector zones 70. Therefore, the method provides the bed height on the basis of an average value of a number of measurements from each detector rather than instantaneous measurements.

The method is as follows:

1. A group of a predetermined number of discrete measurements, typically 10, are collected, or scanned, at a periodic time interval, typically 50 milliseconds apart, from each detector. Both the number of measurements and the time between the measurements can be changed without affecting the method. Each group is taken over a period of time, typically 10 seconds. Thus 10 measurements would be taken in the first 500 milliseconds of a 10 second period. Measurements taken for the remaining 9.5 seconds of each time period may be disregarded for the calculation of bed height. Each group is averaged, and each average is used in calculating the weight of material per unit volume, or bed density of each zone.

$$\text{Bed density} = \frac{\text{weight of material in a zone}}{\text{volume of the zone}}$$

But, weight of material in a zone = [differential pressure over the vertical height of the zone] × [cross-sectional area of the zone], or, weight = pressure × area.

Further, volume of the zone = [cross-sectional area of the zone] × [vertical height of the zone], or volume = area × height, Therefore, bed density = [pressure × area] ÷ [area × height]

or $$\text{bed density} = \frac{\text{average differential pressure}}{\text{zone height}}$$

2. The most recent of a number, typically 20, of bed densities computed in step 1 for all the detector zones are maintained and updated with every new bed density.

3. The last 20 bed densities calculated are averaged for each zone. Then, starting at the zone at the top of the vessel and working downward serially, the average bed densities are reviewed for a non-negative value. If the first non-negative average bed density occurs in detector zone i, then a weight factor WF (a measure of the relationship between the bed densities in the different zones) for detector zone $i+1$ is:

$$WF_{i+1} = \frac{\text{average bed density}_{i+2}}{\text{average bed density}_{i+1}}$$

A WF is only valid if the zone for which it is taken is completely within the bed region.

The WF's for all zones are recalculated every time a new average bed density is calculated to account for changes of material feed to the gasifier.

4. The bed height within zone i is calculated in the following manner:

$$\text{bed height in zone } i = \left[\frac{BD_i}{BD_{i+1}}\right] \times WF_i \times \text{height of zone } i$$

Note first that the WF for detector zone i will retain the last value calculated for it based either on zone i being completely filled or on a theoretical basis since this zone could only be partially filled with fluidized material at this scan. In initial startup of the system, this WF may be preset using either the WF calculated prior to shutdown of the system or a WF calculated on a theoretical basis. Note also that the quantity $$BD_i/BD_{i+1}$$

is a value calculated from typically 10 differential pressure measurements, taken over typically a period of one-half of one second. The quantity $WF_i$, on the other hand, is a value calculated from a larger set of bed densities, typically 20 values of bed density. It is thus taken over a period of about 200 seconds, and is not the inverse of the quantity $$BD_i/BD_{i+1}$$

5. The bed height within the vessel is determined by adding the bed height within zone i to the height within the vessel to the bottom of zone i. Alternatively, the bed height within zone i can be compared to a reference point other than the bottom of the vessel (such as the middle of the vessel), to show the bed height with respect to that reference.

After determination of the bed height, the data processing unit produces a signal. This signal is typically an electrical signal, but may be of another type without limiting the invention. The control manifold acts on this signal, either increasing or decreasing some or all of the input materials.

Figure 3:
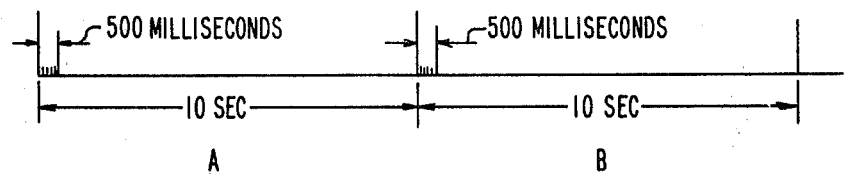
FIG. 3 is a segmented time line, covering approximately 30 seconds.

Example:

Referring now to FIG. 3, there is shown a time interval graph with interval A and B of 10 seconds length. During the first 500 milliseconds of interval A, 10 differential pressure measurements are taken 50 milliseconds apart, from each detector. At the end of the 500 milliseconds, the 10 differential pressure measurements are averaged to give an average differential pressure for each detector for the time interval 1. This process is repeated for time interval 2, and subsequent 10 seconds time intervals.

Figure 4:
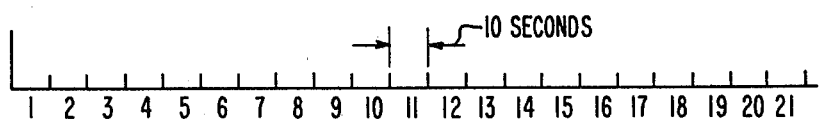
FIG. 4 is a segmented time line, covering approximately 210 seconds.

Referring to FIG. 4, there is shown a time interval graph with intervals 1, 2, 3 and on, to 21, all of 10 seconds length. At the end of each interval the last 20 bed densities are averaged for each zone, to determine an average bed density for that time period. Thus, for interval 20, for one detector, the bed densities for intervals 1 through 20 are averaged, to give an average bed density. For interval 21, the bed densities for a detector for intervals 2 through 21 are averaged. These average bed densities are used in calculation of the weight factor WF, which is recalculated every 10 seconds, using the most recent valid average bed density. Additionally, the bed height is recalculated every 10 seconds, using the most recent bed density calculated, and the most recent valid weight factor WF.

We claim:

1. A method for use in a fluidized bed apparatus comprising a vessel having a bottom, a first substance to be fluidized, a second substance for fluidizing said first substance in a fluidized bed within said vessel, said second substance being a fluid, said fluidized bed having an upper surface and a bed height within said vessel which is the vertical distance from the bottom of the vessel to said upper surface, a controlling means for controlling the flow of at least one of said first or second substance, said controlling means being regulatable by a signal, and a differential pressure detecting system, said system comprising a plurality of differential pressure detectors connected in series, each detector having a high pressure tap connected to said vessel and a low pressure tap connected to said vessel, and adjacent detectors having a common tap to said vessel which serves as said high pressure tap for one detector and said low pressure tap for an adjacent detector, said vessel tap connections for each detector defining a horizontal zone within said vessel corresponding to each said detector, said method for controlling said fluidized bed height comprising the steps of:
   (a) determining the differential pressure sensed by each detector substantially simultaneously;
   (b) repeating step (a), periodically;
   (c) averaging periodically a predetermined number of the latest differential pressures determined for each of said detectors to compute an average differential pressure for each said zone;
   (d) dividing each average differential pressure by the vertical distance in the vessel of each corresponding zone to calculate a fluidized bed density corresponding to each said zone;
   (e) averaging continuously a predetermined number of the most recent fluidized bed densities calculated for each of said zones to obtain an average fluidized bed density for each said zone;
   (f) disregarding any zones for which the most recently calculated average fluidized bed density was non-positive and reserving the zone closest to the bottom of said vessel which was also adjacent to a zone for which the most recently calculated average bed density was non-positive, and for all remaining zones, calculating a weighting factor for each zone by the formula:

$$\text{Weight factor for zone } A = \frac{\text{Average bed density zone } B}{\text{Average bed density zone } A}$$

where zone A is adjacent to and above zone B;
   (g) calculating the height of the bed within the reserved zone by dividing the fluidized bed density of the reserved zone by the fluidized bed density of the zone adjacent to and below the reserved zone, and multiplying by the vertical height of the reserved zone and the last weighting factor calculated for the reserved zone;
   (h) producing said signal representative of said height of said bed within said reserved zone; and
   (i) regulating said controlling means with said signal.

2. The method in accordance with claim 1 wherein said fluidized bed apparatus is a carbonaceous material fluidized bed gasifier.

3. The method in accordance with claim 2 wherein said first substance is carbonaceous material particles.

4. The method in accordance with claim 3 wherein step (a) is repeated after 50 milliseconds.

5. The method in accordance with claim 4 wherein step (c) comprises the step of averaging after 9.5 seconds, the latest 10 consecutive differential pressures determined for each of said detectors to compute an average differential pressure for each said zone.

6. The method in accordance with claim 4 wherein step (e) comprises the step of averaging continuously the most recent 20 fluidized bed densities calculated for each of said zones to figure an average fluidized bed density for each said zone.

* * * * *